United States Patent [19]

Artigues et al.

[11] Patent Number: 5,324,241
[45] Date of Patent: Jun. 28, 1994

[54] KNEE REHABILITATION EXERCISE DEVICE

[76] Inventors: Paul Artigues, 3040 Summitwood Dr., Kennesaw, Ga. 30144; Michael Banyas, 7105 Hunters Branch Dr., Atlanta, Ga. 30328

[21] Appl. No.: 136,802

[22] Filed: Oct. 14, 1993

[51] Int. Cl.⁵ .......................... A63B 21/00; G05G 1/00
[52] U.S. Cl. ..................................... 482/57; 74/594.3; 74/600
[58] Field of Search ....................... 482/57, 60, 62, 63; 74/594.1, 594.3, 600, 591.4

[56] References Cited

U.S. PATENT DOCUMENTS

| | | |
|---|---|---|
| 359,609 | 3/1887 | Jeffery . |
| 363,522 | 5/1887 | Knous . |
| 597,098 | 1/1898 | Bullis .................................. 74/594.3 |
| 625,986 | 5/1899 | Pennock . |
| 1,227,743 | 5/1917 | Burgedorff ......................... 74/594.1 |
| 2,783,044 | 2/1957 | Sbarra . |
| 3,894,281 | 7/1975 | Bloomfield . |
| 4,648,287 | 3/1987 | Preskitt . |
| 4,915,374 | 4/1990 | Watkins ................................ 482/57 |

*Primary Examiner*—Stephen R. Crow
*Attorney, Agent, or Firm*—James A. Hinkle

[57] ABSTRACT

A pedal crank has a throw adjuster comprised of two triangular frames in opposed relationship to a common triangular base that is variable in length. A pedal crank is formed with a peak of a proximal triangular frame attached to a crank axle and a peak of a distal triangular frame attached to a pedal axle. A fixed side of the proximal triangular frame is attached rigidly to the crank axle and a floating side of the proximal triangular frame is attached rotationally to the crank axle. A fixed side of the distal triangular frame is attached rigidly to the pedal axle and a floating side of the distal triangular frame is attached rotationally to the pedal axle. The fixed side of the proximal triangular frame and the fixed side of the distal triangular frame are attached to opposite ends of the common triangular base. Both sides of both triangles are attached pivotally to the common triangular base that is variable in length with a screw shaft, a fluid-operated cylinder, or other length-adjustment means. In an exerciser embodiment, the crank axle is in chain drive relationship to an electrical, fluid or frictional resistor of rotation that is variable in rotational resistance. A calibrator of throw length is positioned parallel to the common base.

15 Claims, 4 Drawing Sheets

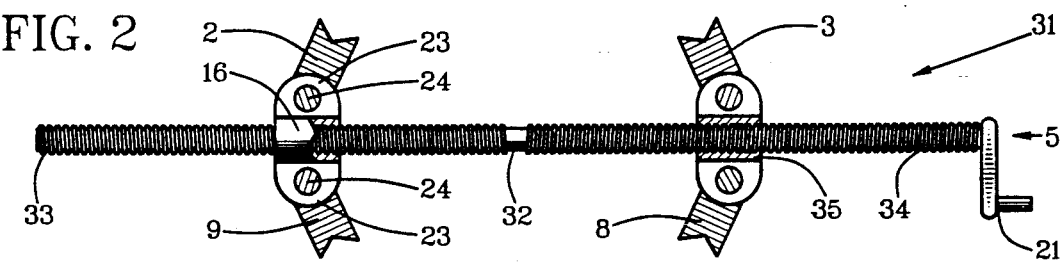
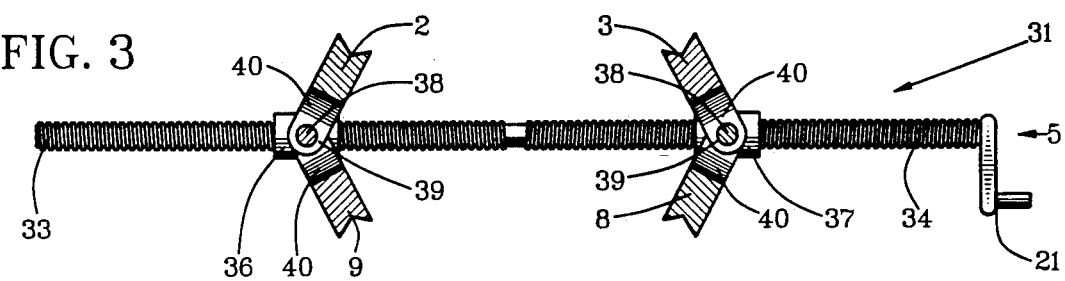
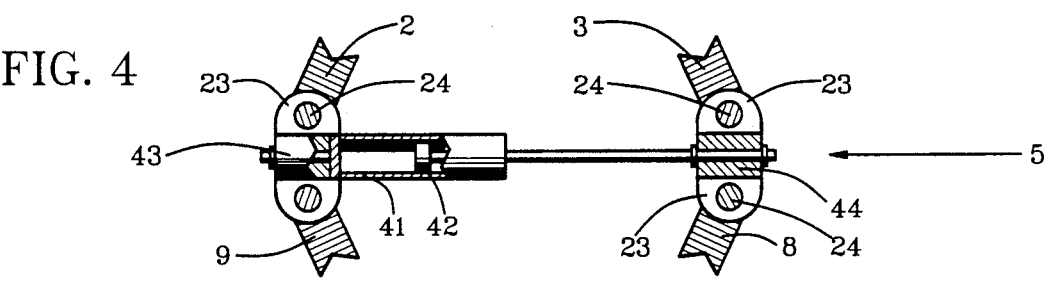
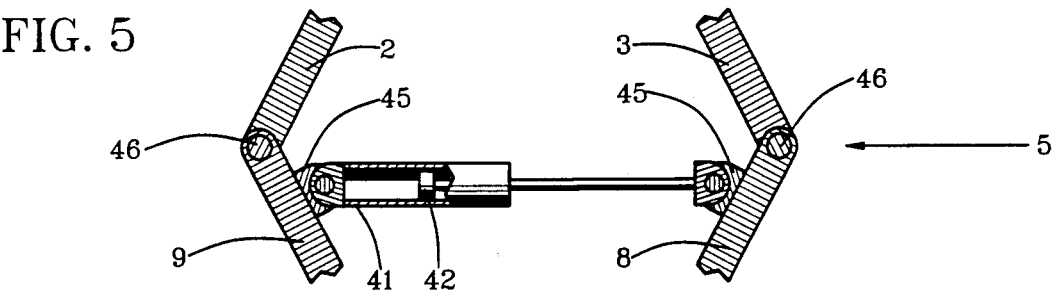
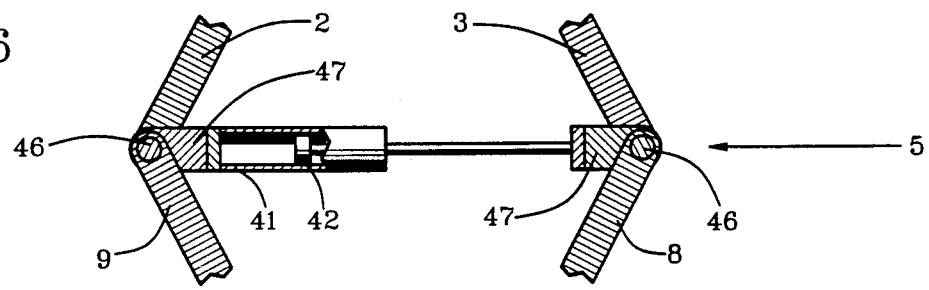

KNEE REHABILITATION EXERCISE DEVICE

BACKGROUND OF THE INVENTION

I. Field of the Invention

The present invention relates generally to the field of crank-throw adjustment mechanisms in which length of crank throw of a pedal crank is adjustable on mechanisms such as leg exercisers, pedal boats and bicycles.

II. Description of the Prior Art

Previous adjusters of length of crank throw of pedal cranks for bicycles and other mechanisms operated similarly have employed a variety of bolt-setting and sliding mechanisms. None have employed length adjustment of a triangular base that is common to two opposed triangles in the manner taught by this invention.

Typical of length adjustment with bolt settings are U.S. Pat. Nos. 393,837, 363,522, 4,850,245 and 4,915,374. Length adjustment with slide mechanisms have included U.S. Pat. Nos. 4,648,287, 625,986 and 359,609. Although adjustment of length of pedal-crank throw is an old art in which U.S. patents were granted over 100 years ago, neither the mechanism nor the geometrical principle employed in this invention has been employed for adjustment of length of crank throw for pedal-opearable machines such as exercisers, bicycles, pedal boats and other pedal-operable machines.

The principle of varying length of a common base of opposed triangles to vary distance between their opposite angles is known in mathematical concept and has been used in some mechanisms. Its use in mechanisms, however, has been limited to car jacks and other positional devices that employ the principle differently. Employing the principle for length adjustment of a pedal-crank throw requires new and different features for achieving rotation than for car jacks and other nonrotational or variously positional devices. Long use of pedal machines when this length-adjustment mechanism in different forms has been known is indicative of novelty that comprises invention such as this crank-throw-adjustment mechanism.

Previous leg exercisers and arm exercisers employing the pedal principle have not been conveniently and easily adjustable in length of crank throw. Adjustability of throw length, however, is highly advantageous to exercise movement for exerciser machines that employ pedal action. Exercise of legs is often impaired by injuries that also make adjustment of exercise machines difficult. Long and short movement of legs in a pedaling action exercises different muscles that injured people often need to exercise separately and that uninjured people often choose to develop separately. But when throw length of a pedal cranks is fixed or is inconvenient to adjust, it is discouraging and time-consuming for uninjured people and often impossible for injured people. The healthiest of exercisers will want to vary the length of throw of a pedal exerciser quickly and easily as they choose each time they exercise or in accordance with an exercise objective. People with different heights and with different lengths of legs need different lengths of pedal-crank throws for similar purposes. This invention helps all alike. It provides convenient, fast, easy and inexpensive length adjustment for pedal-crank throws. Further, it provides different throw length for each leg selectively for those who require different exercise levels for each of their legs.

Bicyclists and pedal-boaters now are limited to a fixed manufactured length of throw for their bicycles and boats regardless of their physical conditions, size or desires. No previous length adjuster for pedal throws has been sufficiently meritorious to be in demand and to be produced on a wide scale for pedal-operated machines.

SUMMARY OF THE INVENTION

In accordance with the present invention, it is contemplated that in light of the problems that have existed and that continue to exist in this field, objectives of this invention are to provide a pedal-crank-throw adjuster which:

Is fast and easy to operate;
Is reliable, strong and light;
Can be adjusted accurately;
Is inexpensive and long-lasting;
Can be used on a wide variety of pedal-crank mechanisms; and which
Is particularly suited to pedal-crank-operated leg-exercise machines.

This invention accomplishes the above and other objectives with a pedal crank having a throw adjuster comprised of two triangular frames in opposed relationship to a common triangular base that is variable in length. A pedal crank is formed with a peak of a proximal triangular frame attached to a crank axle and a peak of a distal triangular frame attached to a pedal axle. A fixed side of the proximal triangular frame is attached rigidly to the crank axle and a floating side of the proximal triangular frame is attached rotationally to the crank axle. A fixed side of the distal triangular frame is attached rigidly to the pedal axle and a floating side of the distal triangular frame is attached rotationally to the pedal axle. The fixed side of the proximal triangular frame and the fixed side of the distal triangular frame are attached to opposite ends of the common triangular base. Both sides of both triangles are attached pivotally to the common triangular base that is variable in length with a screw shaft, a hydraulic cylinder, a pneumatic cylinder or other length-adjustment means. In an exerciser embodiment, the crank axle is in chain drive relationship to an electrical, hydraulic, pneumatic or frictional resistor of rotation that is variable in rotational resistance. A calibrator of throw length is positioned parallel to the common base, however, this is an optional item.

Other objects, advantages and capabilities of the invention will become apparent from the following description taken in conjunction with the accompanying drawings showing preferred embodiments of the invention.

BRIEF DESCRIPTION OF THE DRAWINGS

FIG. 2 is a sectional view of a base-side screw threaded in opposite directions from a central section and having control sleeves attached pivotally with attachment plates to base ends of sides of the oppositely disposed triangular frames for adjustment of length of the common base side of the oppositely disposed triangular frames;

FIG. 3 is a sectional view of a base-side screw threaded in opposite directions from a central section and having control sleeves attached pivotally with side yokes to base ends of sides of the oppositely disposed triangular frames for adjustment of length of the common base side of the oppositely disposed triangular frames;

FIG. 4 is a sectional view of a fluid-operated cylinder and piston attached pivotally to base ends of sides of the oppositely disposed triangular frames for adjustment of length of the common base side of the oppositely disposed triangular frames;

FIG. 5 is a sectional view of a fluid-operated cylinder and piston attached pivotally to base ends of sides of one of the oppositely disposed triangular frames for adjustment of length of the common base side of the oppositely disposed triangular frames;

FIG. 6 is a sectional view of a fluid-operated cylinder and piston attached pivotally with a central attachment means to base ends of sides of the oppositely disposed triangular frames for adjustment of length of the common base side of the oppositely disposed triangular frames;

DESCRIPTION OF THE PREFERRED EMBODIMENTS

Figure 1:
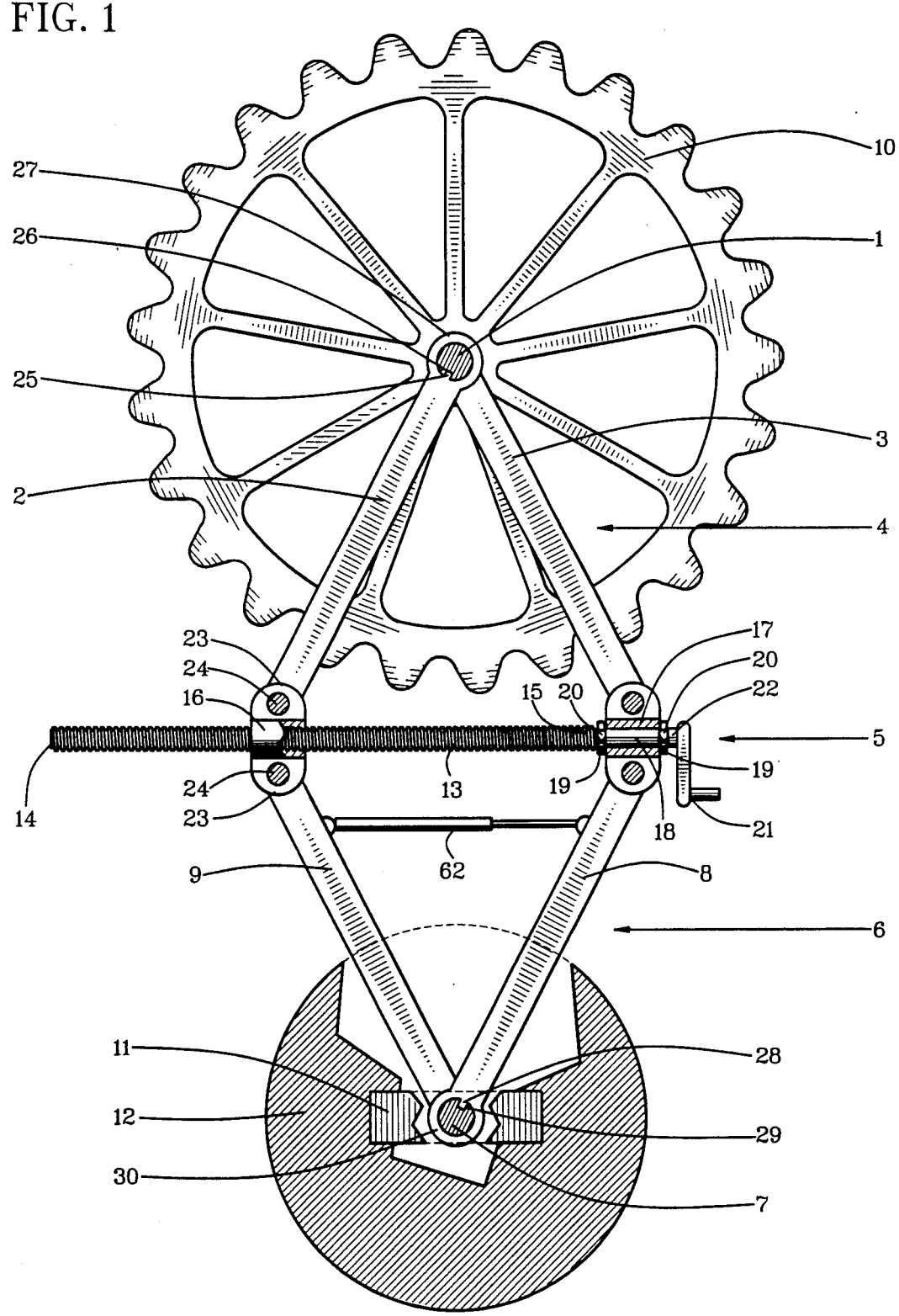
FIG. 1 is a partial cutaway side view of a pedal-crank-throw adjuster with a screw threaded in one direction for adjustment of length of a common base side of oppositely disposed triangular frames.
Figure 7:
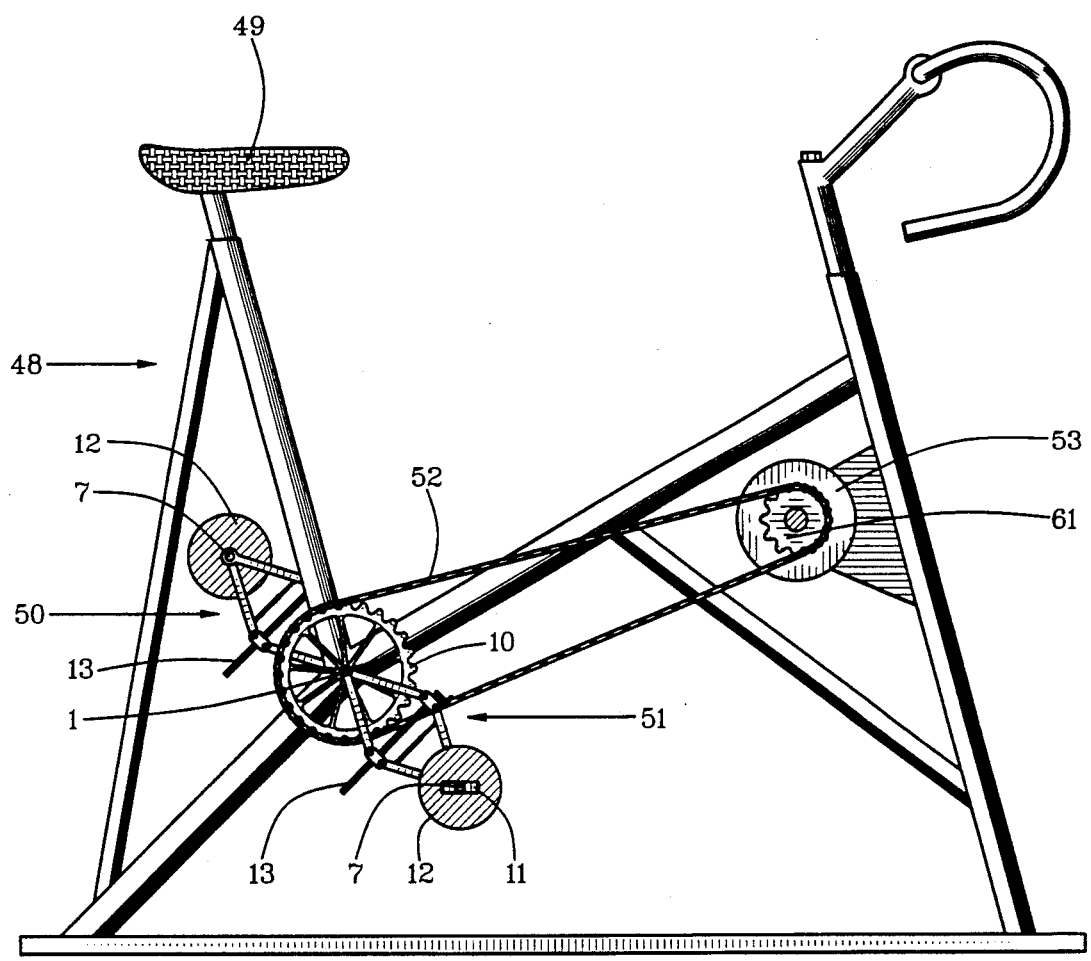
FIG. 7 is a side elevation view of a leg-exercise machine comprising a pedal-operable device of this invention.
Figure 8:
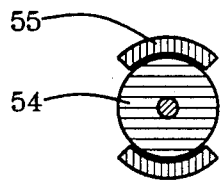
FIG. 8 is a schematic representation of an electrical generator employed as a resistor for exercise with the leg-exercise machine.
Figure 9:
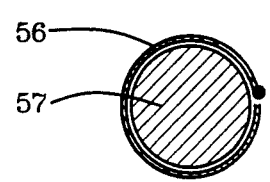
FIG. 9 is a schematic representation of a wheel with a brake as a mechanical device for exercise resistance.

Referring to the drawings wherein like reference numerals designate corresponding parts throughout the several figures, reference is made first to FIG. 1. A crank axle 1 is attached rigidly to a fixed side 2 and rotationally to a floating side 3 of a proximal triangular frame 4 having a common base side 5 with a distal triangular frame 6 that is oppositely disposed in a common plane. A pedal axle 7 is attached rigidly to a fixed side 8 and rotationally to a floating side 9 of the distal triangular frame 6. The common base side 5 is attached pivotally to all four sides 2, 3, 8 and 9 of both triangular frames 4 and 6. Distance between the crank axle 1 and the pedal axle 7 is adjusted by adjustment of length of the common base side 5. A power-takeoff wheel 10 is attached to the crank axle 1 and a pedal 11 is attached to the pedal axle 7. An ankle guard 12 is provided between the pedal 11 and the distal triangular frame 6. The ankle guard 12 is an accessory device and may be dispensed with if desired.

The crank axle 1 and the pedal axle 7 are at peaks of the proximal triangular frame 4 and the distal triangular frame 6 respectively. Distances between the peaks is varied in proportion to length of the common base side 5 to change length of pedal-crank throw.

Use of a threaded screw 13 is one alternative for adjustment of length of the common base side 5. In this embodiment, the threaded screw 13 is threaded in the same direction from a first end 14 to a second end 15. One means for attaching all four sides 2, 3, 8 and 9 pivotally to the threaded screw 13 is use of a first control sleeve 16 having internal threading that matches threading on the threaded screw 13. A second control sleeve 17 has an internal periphery in rotational contact with an external periphery of a screw-control shaft 18 that is extended from the second end 15 of the threaded screw 13. Linear travel of the screw-control shaft 18 is arrested by a linear-travel-restriction means such as rings 19 in ring grooves 20 in the screw-control shaft 18 proximate opposite ends of the second control sleeve 17 when the threaded screw 13 is rotated with a screw crank 21 that is positional on a control end 22 of the screw-control shaft 18.

The first control sleeve 16 and the second control sleeve 17 can have attachment extensions 23 through which attachment axles 24 are inserted for pivotal attachment of sides 2, 3, 8 and 9. An optional means for pivotal attachment of the of the sides 2, 3, 8 and 9 is described in relation to FIGS. 3 and 11.

The fixed side 2 of the proximal triangular frame 4 can be attached rigidly to the crank axle 1 with proximal key 25 extended from the fixed side 2 into a proximal keyway 26 in the crank axle 1. This prevents rotational contact but allows linear sliding for placement of the fixed side 2 on the crank axle 1 to achieve what is referred to as a rigid contact that is rigid rotationally but not linearly. The floating side 3 of the proximal triangular frame 4 can have both rotating and linearly sliding contact with the crank axle 1 by omission of the proximal key 25 in a similar proximal bearing end 27 of the fixed side 2 and the floating side 3 of the proximal triangular frame 4. Flotation of the floating side 3 of the proximal triangular frame 4 has reference to both rotationally and linearly sliding contact with the crank axle 1.

The fixed side 8 of the distal triangular frame 6 can have a similar distal key 28 extended into a distal keyway 29 in the pedal axle 7 from a similar distal bearing end 30 of the fixed side 8. Similar rigid and floating relationships exist between the pedal axle 7 and the sides 8 and 9 and between the crank axle 1 and the sides 2 and 3. However, it is preferable that the fixed sides 2 and 8 be positioned on opposite sides of the respective triangular frames 4 and 6 for rotation of the pedal 11 and for adjustment of distance between the pedal 11 and the crank axle 1 simultaneously.

For accurate adjustment of distance between the crank axle 1 and the pedal axle 7, a length calibrator 62 can have opposite ends attached to opposite sides of either triangular frame 4 or 6. Attachment between sides 8 and 9 of the distal triangular frame 6 as illustrated is preferred for most use conditions such as exercise machines. As mentioned earlier, the calibrator 62 is an accessory and may be dispensed with if cost savings become an objective.

Referring to FIG. 2, length of the common base side 5 can be regulatable or adjustable with an opposite-threaded screw 31 that is threaded in one direction from a central section 32 to a first end 33 and threaded in an opposite direction from the central section 32 to a second end 34. The same first control sleeve 16 as for the threaded screw 13 can be used for the first end 33. But for the second end 34, an oppositely threaded control sleeve 35 must be employed. The same attachment extensions 23 and attachment axles 24 can be employed for both control sleeves 16 and 35 as for use of the threaded screw 13. The same screw crank 21 also can be employed.

In addition to rigidity and compactness, one of the advantages of this opposed-triangular form of pedal-throw length adjustment is speed. Movement of two triangular peaks in opposite directions with one threaded screw 13 in one control sleeve 16 causes change in distance faster than with a screw in conventional linear relationship. Distance change is two times faster yet with the opposite-threaded screw 31, however. This occurs because each of the two peaks are being moved relative to length of travel of the single length of the threaded screw 13. With the opposite-threaded screw 31, travel proportions double for the additional threaded end 34.

Referring to FIG. 3, the opposite-threaded screw 31 can be provided with a yoked first control sleeve 36 and a yoked second control sleeve 37. Yoke-attachment axles 38 can be extended from opposite sides of the yoked control sleeves 36 and 37 into yoke bearings 39 of yokes 40. The yokes 40 are positioned on a base end of sides 2, 3, 8 and 9 of the triangular frames 4 and 6. This provides a power takeoff with less length but more width of the control sleeves 16, 17, 35, 36 and 37 on which this attachment means is employed.

Referring to FIG. 4, length of the common base side 5 can be adjusted with a fluid-operated cylinder 41 and piston 42. A head end of the fluid-operated cylinder 41 can be attached directly to a first control attachment 43 and a shaft of the piston 42 can be attached to a second control attachment 44. The same attachment extensions 23 and attachment axles 24 can be employed as for control sleeves 16, 17 and 35. Fluid for operation of the fluid-operated cylinder 41 can be a liquid or a gas, depending on tradeoff factors of the use conditions.

Referring to FIG. 5, length of the common base side 5 can be adjusted by a fluid-operated cylinder 41 and piston 42 or by either type of threaded screw 13 or 31 from offset attachments 45 on either sides 8 and 9 of the distal triangular frame 6 as shown or on sides 2 and 3 of the proximal triangular frame 4 not shown. This has a greater yet speed factor for length adjustment of the pedal-crank throw. This embodiment can have single attachment axles 46 at base ends of sides 2, 3, 8 and 9.

Referring to FIG. 6, distance between the single-attachment axles 46 can be adjusted to adjust length of the common base side 5 with a fluid-operated cylinder 41 and piston 42 attached to central attachments 47. This is a preferable embodiment for use of the fluid-operated cylinder 41 and piston 42.

Figure 10:
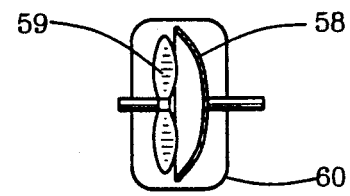
FIG. 10 is a schematic representation of a fluid device for exercise resistance.

Referring to FIGS. 7-10 primarily and to FIGS. 1-6 and 11 as applicable, a leg-exercise machine 48 as a pedal-operated device has a seat 49 in operative relationship to pedals 11 on first pedal crank 50 and second pedal crank 51 that are each comprised of the triangular frames 4 and 6. Such pedal cranks 50 and 51 are oppositely disposed circumferentially in relation to the crank axle 1 and positioned proximate opposite ends of the crank axle 1 on opposite sides of the leg-exercise machine 48. An endless drive chain 52 in chain-drive relationship to the power-takeoff wheel 10 transfers work load to an exercise resistor 53. The exerciser resistor 53 can be either electrical, mechanical or fluid operated. An electrical device is shown in schematic form with an electrical rotor 54 between two magnets 55 in FIG. 8. A mechanical device is shown in schematic form with a brake 56 on a wheel 57 in FIG. 9. A fluid-operated device also is illustrated in schematic form with flow resistor 58 downstream fluidly from an impeller 59 in a closed-loop container 60 as shown in FIG. 10. Either form of resistor can have a resistor-drive wheel 61 for receiving work load from the power-takeoff wheel 10.

Although chain drive is illustrated, the power-takeoff wheel 10 can be a pulley wheel for a belt drive. Direct drive means also can be employed.

Figure 11:
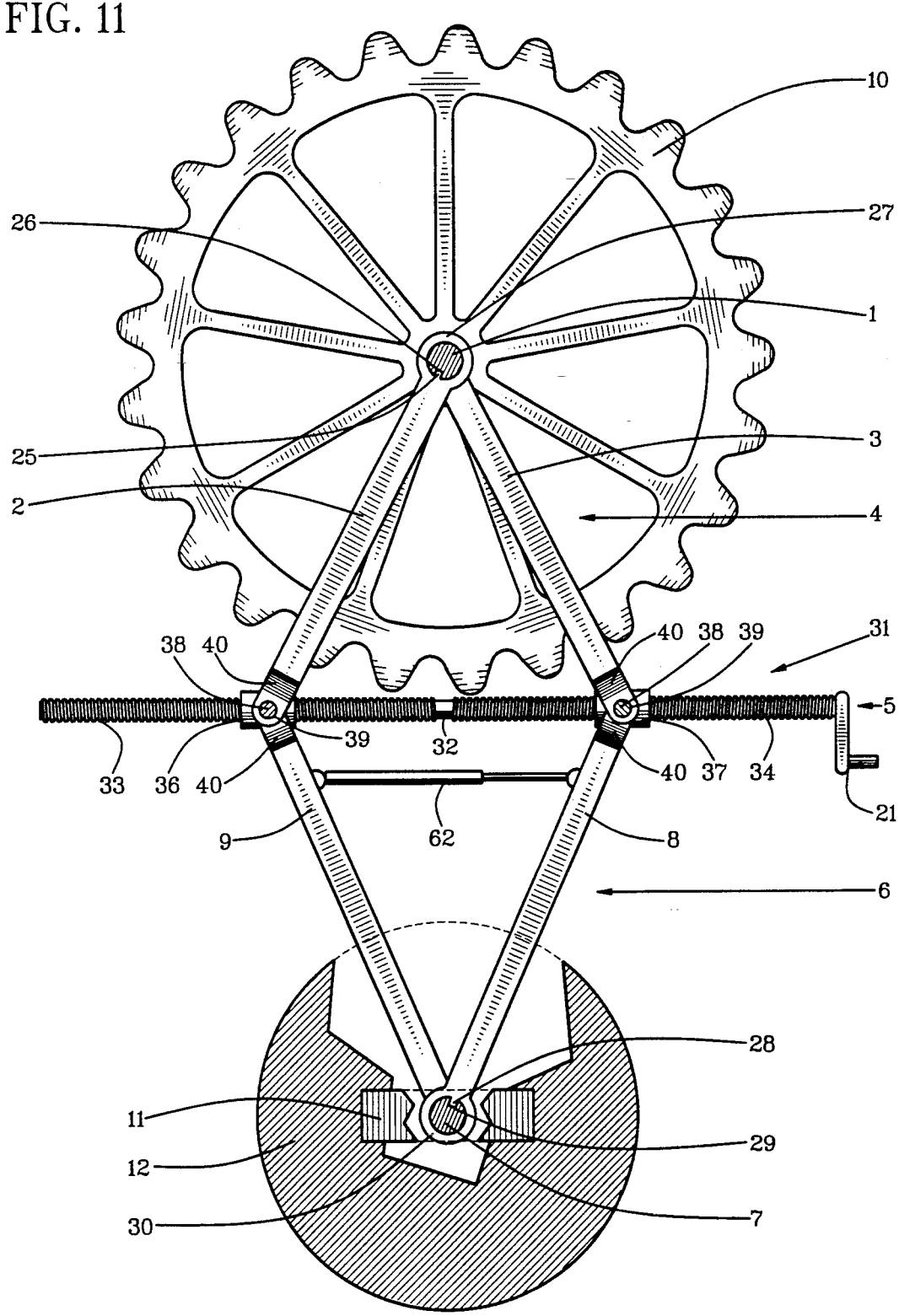
FIG. 11 is a modification of the FIG. 1 illustration with an oppositely threaded screw and with opposite triangular frames having different lengths.

Referring to FIG. 11, sides 2 and 3 of the proximal triangular frame 4 can be the same length as sides 8 and 9 of the distal triangular frame 6 to form a rhombic parallelogram with such sides. However, a parallelogram is not necessary nor preferred for all use conditions. It is necessary, however, that both sides of each triangular frame 4 and 6 be equal. With sides 2 and 3 equal in length to each other but different from sides 8 and 9, as shown in FIG. 11, the axles 1 and 7 are different distances from the common base side 5. This is preferred for some use conditions. Also shown in FIG. 11 is use of the opposite-threaded screw 31 as described in relation to FIG. 3.

Various modifications may be made of the invention without departing from the scope thereof and it is desired, therefore, that only such limitations shall be placed thereon as are imposed by the prior art and which are set forth in the appended claims.

What is claimed is:

1. A pedal-crank-throw-adjuster mechanism comprising:

a pedal-operable device, a crank axle attached rotationally to the pedal-operable device at an operable position in relation to a seat on the pedal-operable device, first and second pedal cranks that are oppositely disposed in pedal-crank relationship on the crank axle, each of the first and second pedal cranks having a proximal triangular frame and a distal triangular frame that are oppositely disposed in a common plane and have a common base side that is adjustable in length, a fixed side of the proximal triangular frame of each pedal crank having a peak end attachable rigidly to the crank axle and a base end attachable pivotally to the common base side, a floating side of the proximal triangular frame of each pedal crank having a peak end attachable pivotally to the crank axle and a base end attachable pivotally to the common base side, a fixed side of the distal triangular frame of each pedal crank having a peak end attachable rigidly to a pedal axle and a base end attachable pivotally to the common base side, a floating side of the distal triangular frame of each pedal crank having a floating side attachable pivotally to the pedal axle and a base end attachable pivotally the common base side, a pedal attachable rotationally to each of the pedal axles, and a power-takeoff wheel attachable to the crank axle.

2. A pedal-crank-throw-adjuster mechanism as claimed in claim 1 wherein the pedal-operable device is a leg-exercise machine.

3. A pedal-crank-throw-adjuster mechanism as claimed in claim 2 and further comprising chain-drive cogs on the power-takeoff wheel, and an endless drive chain in chain-drive relationship to the power-takeoff wheel.

4. A pedal-crank-throw-adjuster mechanism as claimed in claim 3 and further comprising an exercise resistor attachable to the leg-exercise machine in chain-rotatable relationship to the endless drive chain.

5. A pedal-crank-throw-adjuster mechanism as claimed in claim 4 wherein the exercise resistor is variable in resistance to rotation by the endless drive chain.

6. A pedal-crank-throw-adjuster mechanism as claimed in claim 5 wherein the exercise resistor is an electrical generator.

7. A pedal-crank-throw-adjuster mechanism as claimed in claim 5 wherein the exercise resistor is a mechanical-brake device with frictional resistance that is regulatable.

8. A pedal-crank-throw-adjuster mechanism as claimed in claim 5 wherein the exercise resistor is a fluid-operable device with resistance to fluid flow that is regulatable.

9. A pedal-crank-throw-adjuster mechanism as claimed in claim 1 wherein:
   length of the common base side is regulatable by means of a threaded screw that is threaded in one direction from a central section of the threaded screw to a first end of the threaded screw and oppositely threaded from the central section of the threaded screw to a second end of the threaded screw,
   a first control sleeve attached pivotally to the base end of the fixed side of the proximal triangular frame and attached pivotally to the base end of the floating side of the distal triangular frame,
   internal threading in the first control sleeve in threadable relationship to threading extended from the central section of the threaded screw to the first end of the threaded screw,
   a second control sleeve attached pivotally to the base end of the floating side of the proximal triangular frame and attached pivotally to the base end of the fixed side of the distal triangular frame,
   internal threading in the second control sleeve in threadable relationship to threading extended from the central section of the threaded screw to the second end of the threaded screw, and
   a screw crank attachable in crank-drive relationship to a desired end of the threaded screw.

10. A pedal-crank-throw-adjuster mechanism as claimed in claim 1 wherein:
   length of the common base side is regulatable by means of a threaded screw that is threaded in a single direction intermediate a first end of the threaded screw and a second end of the threaded screw,
   a first control sleeve attached pivotally to the base end of the fixed side of the proximal triangular frame and attached pivotally to the base end of the rotational side of the distal triangular frame,
   internal threading in the first control sleeve in threadable relationship to threading extended from proximate the first end to proximate the second of the threaded screw,
   a second control sleeve attached pivotally to the base end of the floating side of the proximal triangular frame and attached pivotally to the base end of the fixed side of the distal triangular frame,
   a screw-control shaft extended from the second end of the threaded screw and positioned in rotational relationship to an internal periphery of the second control sleeve,
   linear-travel-restriction means in linear-travel-restricting relationship between the screw-control shaft and the second control sleeve, and
   a screw crank attachable in crank-drive relationship to a desired end of the threaded screw.

11. A pedal-crank-throw-adjuster mechanism as claimed in claim 10 wherein the linear-travel-restriction means is a ring in a ring groove in each end of the screw-control shaft proximate opposite sides of the second control sleeve.

12. A pedal-crank-throw-adjuster mechanism as claimed in claim 1 wherein:
   length of the common base side is regulatable by means of a fluid-operated cylinder having a piston that is fluid-operable in slidable sealed contact with an internal periphery of fluid-operated cylinder,
   a head of the fluid-operated cylinder attached pivotally to the base end of the fixed side of the proximal triangular frame and attached pivotally to the base end of the floating side of the distal triangular frame, and
   a piston shaft attached pivotally to the base end of the floating side of the proximal triangular frame and attached pivotally to the base end of the fixed side of the distal triangular frame.

13. A pedal-crank-throw-adjuster mechanism as claimed in claim 1 wherein lengths of the fixed sides and the floating sides of the proximal triangular frame and the distal triangular frame are equal, such that a parallelogram is formed by the fixed sides and the floating sides of the proximal triangular frame and the distal triangular frame exclusive of the common base, and the heights of the proximal triangular frame and the distal triangular frame are equal at all adjustable lengths of the common base side.

14. A pedal-crank-throw-adjuster mechanism as claimed in claim 1 wherein lengths of the fixed side and the floating side of the proximal triangular frame are different from lengths of the fixed side and the floating side of the distal triangular frame, such that heights of the proximal triangular frame and the distal triangular frame are different in constant proportions at adjustable lengths of the common base side.

15. A pedal-crank-throw-adjuster mechanism as claimed in claim 1 and further comprising a calibrator of throw length having opposite ends attached pivotally to opposite sides of a desired triangular frame.

* * * * *